S. S. & D. A. HUFFMAN.
TIRE PROTECTOR.
APPLICATION FILED MAR. 13, 1913.
1,072,464.
Patented Sept. 9, 1913.
2 SHEETS—SHEET 1.
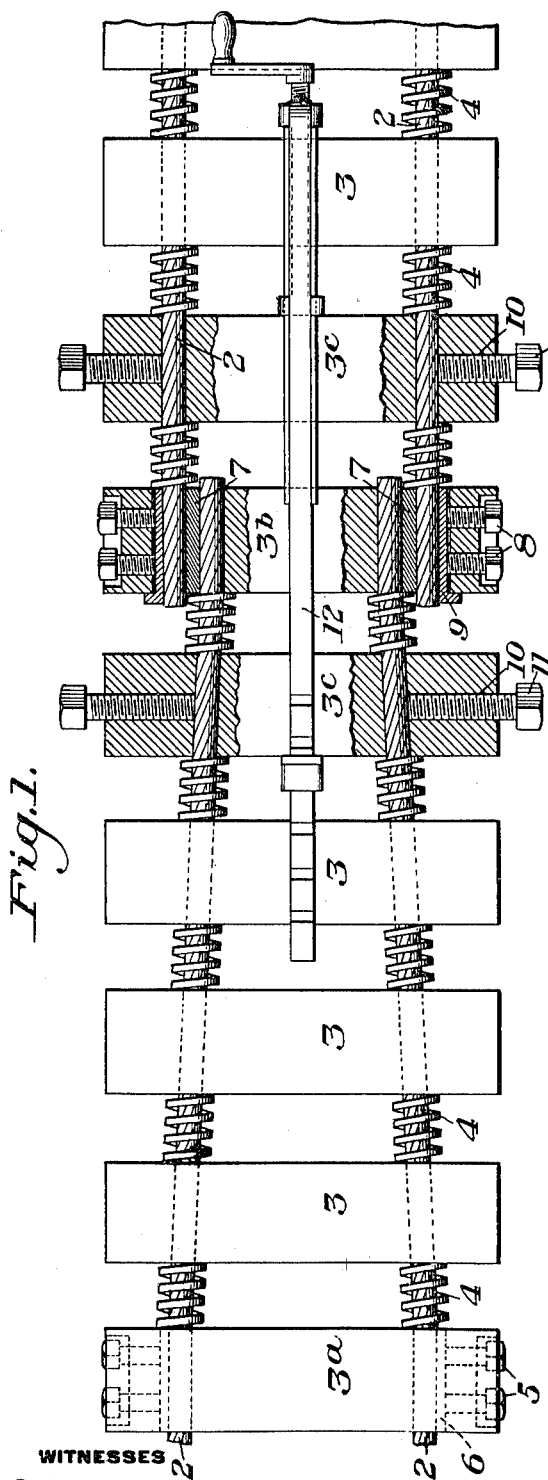
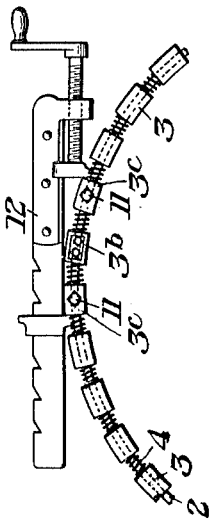
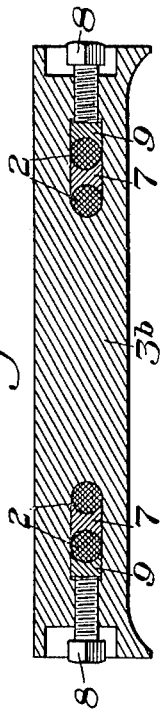
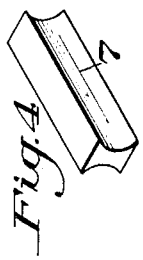
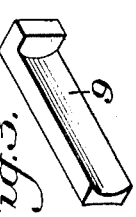
WITNESSES
R. A. Balderson
G. B. Bluming
INVENTORS
S. S. Huffman
D. A. Huffman
By Bakewell, Byrnes & Parmelee
Attys S. S. & D. A. HUFFMAN.
TIRE PROTECTOR.
APPLICATION FILED MAR. 13, 1913.
1,072,464.
Patented Sept. 9, 1913.
2 SHEETS—SHEET 2.
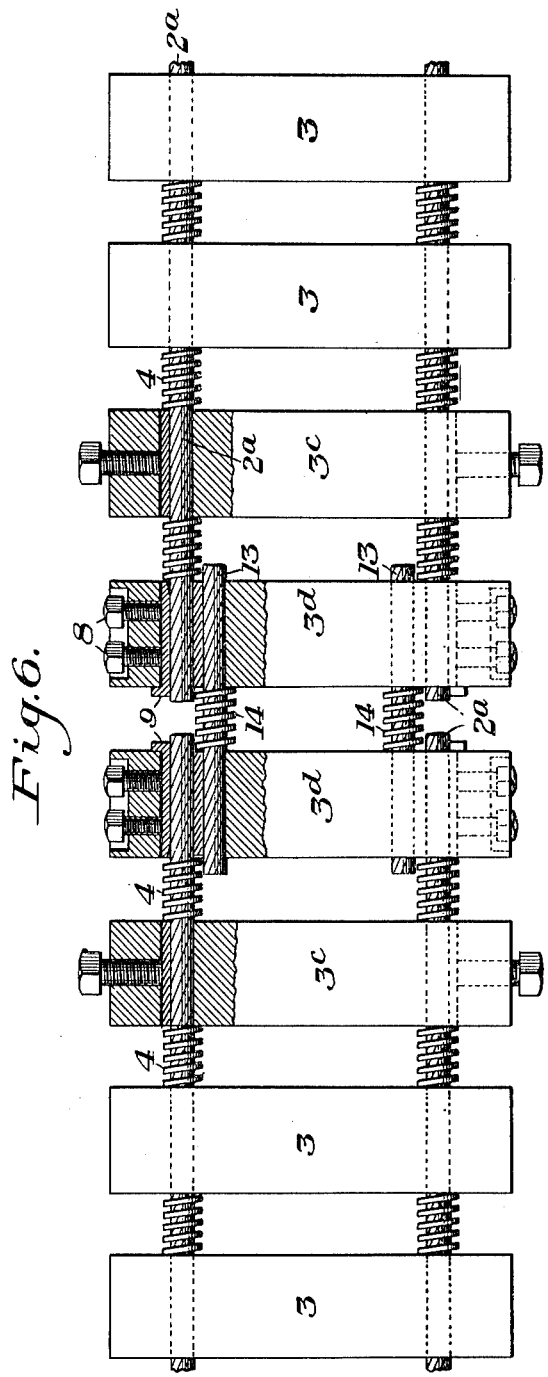
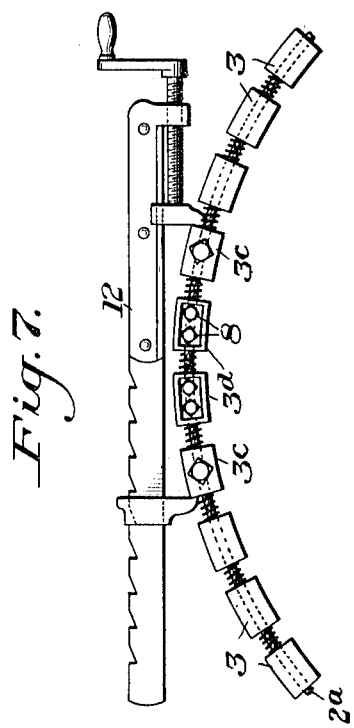
WITNESSES
INVENTORS

UNITED STATES PATENT OFFICE.

SILAS S. HUFFMAN AND DUR A. HUFFMAN, OF YOUNGSTOWN, OHIO.

TIRE-PROTECTOR.

1,072,464.	Specification of Letters Patent.	Patented Sept. 9, 1913.

Application filed March 13, 1913. Serial No. 753,997.

*To all whom it may concern:*

Be it known that we, SILAS S. HUFFMAN and DUR A. HUFFMAN, citizens of the United States, and residents of Youngstown, in the county of Mahoning and State of Ohio, have invented a new and useful Improvement in Tire-Protectors, of which the following is a full, clear, and exact description, reference being had to the accompanying drawings, forming part of this specification, in which—

Figure 1 is a view partly in plan and partly in horizontal section of a portion of a tire protector embodying our invention, and also showing a clamping device applied thereto. Fig. 2 is a longitudinal section on one of the tread blocks. Figs. 3 and 4 are detail perspective views of the clamping members. Fig. 5 is a side elevation of a portion of the protector and showing the clamp applied thereto. Fig. 6 is a view similar to Fig. 1, but showing a modification, and Fig. 7 is a view similar to Fig. 5, but illustrating the modification shown in Fig. 6.

Our invention has relation to protectors for vehicle tires; and relates more particularly to an improvement in the class of tire protectors which is described and claimed in our application Serial No. 666,587, filed December 18, 1911. These protectors consist of a plurality of flexible connections, such as cables, having strung thereon a series of transversely extending blocks which are recessed on their inner faces to fit a solid tire and having spacing pieces also strung on the flexible connections between the blocks.

The present invention has more particular relation to the provision of means for facilitating the application of the protector to a wheel and its tire; to the provision of means of novel character for uniting the ends of the connections; and to other detail improvements in the construction of the protector.

In the accompanying drawings, the numeral 2 designates the flexible connections in the form of wire cables, 3 the transversely extending tread blocks, and 4 the spacers which are shown as consisting of helical springs strung on the connections between the tread blocks. These springs are of less diameter than the radial thickness of the blocks so as to be not only normally out of contact with the surface of the tire, but also below the tread surfaces of the blocks.

While the majority of the blocks are loosely strung on the cables, we prefer to fasten one or more of the blocks at points intermediate the ends of the cables thereto, so as to prevent the springs from jamming together, as in deep mud where excessive power is required to pull out. These blocks, one of which is shown at $3^a$ in Fig. 1 may be fastened to the cables in any suitable manner, as by means of set-screws 5 extending into the ends of the blocks and either biting the cable directly, or acting against an interposed clamping jaw 6.

The ends of the cables are preferably united in the manner shown in Figs. 1 and 2, by extending them in overlapping relation through suitable openings formed in one of the end tread blocks $3^b$. A spacing and clamping member 7, shown in detail in Fig. 4, and having concaved side faces to fit the cables is interposed between their overlapping ends, and the parts are all secured by means of set-screws 8 extending through the ends of the blocks and engaging the clamping members or jaws 9.

Inasmuch as the tread blocks at the end portions of the cables are loosely strung thereon, it becomes necessary to provide special means whereby a suitable clamping tool may be engaged with the end portions of the protector in tightening the device around the tire and holding it in tightened position while the ends of the cables are being secured. For this purpose, the two transverse tread blocks $3^c$ next adjacent to the connecting tread block $3^b$ are each provided with a threaded aperture 10 extending into each end thereof to receive a clamping screw 11.

In applying the protector to a wheel, the screws 11 are turned in to firmly bite the cables, thus causing the two blocks $3^c$ to have a secure pulling engagement with the cables. A suitable clamp, such as shown at 12 in Figs. 1 and 5, is then engaged with these two blocks $3^c$ and the protector is drawn firmly around the periphery of the tire and is held in this position by the clamp while the ends of the cables are being secured in the connecting block $3^b$. The screws 10 are then released and may be removed if desired.

In Figs. 6 and 7 we have shown a modification of our invention in which the flexible connections $2^a$, instead of having overlapping splicing portions clamped in a single tread block, have their end portions secured in the two tread blocks 3ᵈ. These two blocks are in turn connected by the auxiliary splicing connections 13, which preferably consist of pieces of cable of the same character as that constituting the connections. 14 designate spring spacers on these auxiliary connections, between the two blocks 3ᵈ. The ends of the connections 2ᵃ and the overlapping auxiliary connections 13 are secured in the blocks 3ᵈ by means of clamps similar to those used for securing the overlapping portions of the connections to the tread block 3ᵇ in the form first described.

In some respects this construction is preferable to that first described, as it will be noted that it is not necessary to divert the end portions of the connections 2ᵃ in order to cause them to overlap. The avoidance of this diversion gives a straight circumferential pull on the connections throughout their length.

Our invention provides means of simple, convenient and effective character for firmly securing the ends of the cables to each other. It also provides means of very simple character whereby the applying clamp can be given a pulling engagement with the cables. This, however, may be accomplished in various other ways than that shown, since certain of the end blocks may be engaged with the cables in various ways so as to provide a pulling engagement therewith. Other changes may be made in the details of construction and arrangement of the parts.

We claim:

1. A tire protector comprising a plurality of flexible connections, a series of transverse tread blocks loosely strung on said connections, spacers between the blocks, and means near the ends of the protector to form clamp-engaging shoulders or abutments; substantially as described.

2. A tire protector comprising a plurality of flexible connections, a series of transverse tread blocks strung on said connections, spacers between the blocks, and means whereby two of said blocks at the ends of the connections may be provided with a pulling engagement with the connections; substantially as described.

3. A tire protector comprising a plurality of flexible connections, a series of transverse tread blocks loosely strung on said connections, and spacers between the blocks, two of the said blocks one near each end of the connections having clamping means for temporarily securing them to the connections; substantially as described.

4. A tire protector comprising a plurality of connections, a series of transverse tread blocks strung on said connections, and spacers between the blocks, the majority of said blocks being loosely strung on the cables but some of them having a fixed engagement therewith; substantially as described.

5. A tire protector comprising a plurality of connections, a series of transverse tread blocks strung on said connections, and resilient spacers between the blocks, the majority of said blocks being loosely strung on the cables but some of them having a fixed engagement therewith; substantially as described.

6. A tire protector comprising a plurality of flexible connections, a series of transverse tread blocks loosely strung on said connections, and spacers between the blocks, two of the said blocks one near each end of the connections having clamping means for temporarily securing them to the connections, and means for securing the end portions of the connections between the two blocks; substantially as described.

7. A tire protector comprising a plurality of flexible connections, a series of transverse tread blocks loosely strung on said connections, and spacers between the blocks, two of the said blocks one near each end of the connections having clamping means for temporarily securing them to the connections, and the ends of the connections having splicing means intermediate the said two blocks; substantially as described.

8. A tire protector comprising a plurality of flexible connections arranged to extend circumferentially around a vehicle tire, a series of transverse tread blocks loosely strung on said connections, and spacers between the blocks, one block near each end of the connections having means whereby it may be releasably fixed to said connections, the end portions of said connections extending beyond said two blocks, and means intermediate said two blocks for engaging and rigidly fastening the ends of said connections; substantially as described.

In testimony whereof, we have hereunto set our hands.

SILAS S. HUFFMAN.
DUR A. HUFFMAN.

Witnesses:
ANTHONY B. CALVIN,
B. L. SMITH.